(12) United States Patent
Boelitz et al.

(10) Patent No.: US 8,408,497 B2
(45) Date of Patent: Apr. 2, 2013

(54) LAUNCH VEHICLES WITH FIXED AND DEPLOYABLE DECELERATION SURFACES, AND/OR SHAPED FUEL TANKS, AND ASSOCIATED SYSTEMS AND METHODS

(75) Inventors: Frederick W. Boelitz, Sammamish, WA (US); Mark Featherstone, Issaquah, WA (US); Christopher M. Gil, Kent, WA (US); Roger E. Ramsey, Renton, WA (US); David M. Biggs, Kent, WA (US)

(73) Assignee: Blue Origin, LLC, Kent, WA (US)

( * ) Notice: Subject to any disclaimer, the term of this patent is extended or adjusted under 35 U.S.C. 154(b) by 148 days.

(21) Appl. No.: 12/712,156

(22) Filed: Feb. 24, 2010

(65) Prior Publication Data

US 2010/0320329 A1 Dec. 23, 2010

Related U.S. Application Data

(60) Provisional application No. 61/155,115, filed on Feb. 24, 2009, provisional application No. 61/155,132, filed on Feb. 24, 2009.

(51) Int. Cl.
*B64G 1/62* (2006.01)
(52) U.S. Cl. .................. 244/158.9; 244/159.1
(58) Field of Classification Search .............. 244/158.9, 244/159.1, 159.3, 171.1, 171.3, 171.7, 121
See application file for complete search history.

(56) References Cited

U.S. PATENT DOCUMENTS

| 2,464,827 | A | 3/1949 | Noyes |
| 3,711,040 | A | 1/1973 | Carver |
| 5,568,901 | A | 10/1996 | Stiennon |
| 5,871,173 | A * | 2/1999 | Frank et al. .............. 244/1 TD |

(Continued)

OTHER PUBLICATIONS

U.S. Appl. No. 12/712,083, filed Feb. 24, 2010, Featherstone.

(Continued)

*Primary Examiner* — Joseph W Sanderson
*Assistant Examiner* — Brian M O'Hara
(74) *Attorney, Agent, or Firm* — Perkins Coie LLP

(57) ABSTRACT

Launch vehicles with fixed and deployable deceleration surfaces and associated systems and methods are disclosed. A system in accordance with a particular embodiment includes a launch vehicle that has a first end and a second end generally opposite the first end, and is elongated along a vehicle axis extending between the first and second ends. The vehicle carries an exposed outwardly facing surface having a first region positioned or positionable to have a first cross-sectional area generally normal to the vehicle axis toward the first end of the vehicle, and a second region positioned or positionable to have a second cross-sectional area generally normal to the vehicle axis toward the second end of the vehicle. The first cross-sectional area is less than the second cross-sectional area. The system can further include a propulsion system carried by the launch vehicle and having at least one nozzle positioned toward the first end of the vehicle to launch the launch vehicle. In a further particular embodiment, the exposed surface can include a deployable flare surface that is positioned toward the forward section of the vehicle and is stowed during an ascent phase of the vehicle. During descent, the deployable flare surface can pivot outwardly to slow the vehicle down for a tail-down landing. Systems is accordance with other embodiments include launch vehicles with fuel tanks shaped to control the motion of the center of gravity of fuel in the tanks as the fuel level in the tank changes.

25 Claims, 9 Drawing Sheets

U.S. PATENT DOCUMENTS

| | | | |
|---|---|---|---|
| 5,873,549 A * | 2/1999 | Lane et al. | 244/158.9 |
| 5,927,653 A | 7/1999 | Mueller et al. | |
| 6,193,187 B1 | 2/2001 | Scott et al. | |
| 6,247,666 B1 | 6/2001 | Baker et al. | |
| 6,454,216 B1 | 9/2002 | Kiselev et al. | |
| 6,666,402 B2 | 12/2003 | Rupert et al. | |
| 6,929,576 B2 | 8/2005 | Armstrong et al. | |
| 7,344,111 B2 * | 3/2008 | Janeke | 244/158.9 |
| 2006/0113425 A1 | 6/2006 | Rader | |
| 2008/0078884 A1 | 4/2008 | Trabandt et al. | |
| 2009/0206204 A1 * | 8/2009 | Rosen | 244/158.5 |

OTHER PUBLICATIONS

International Search Report and Written Opinion, International Application No. PCT/US2010/025281, Applicant: Blue Origin, LLC., mailed Nov. 2, 2010, 16 pages.

* cited by examiner

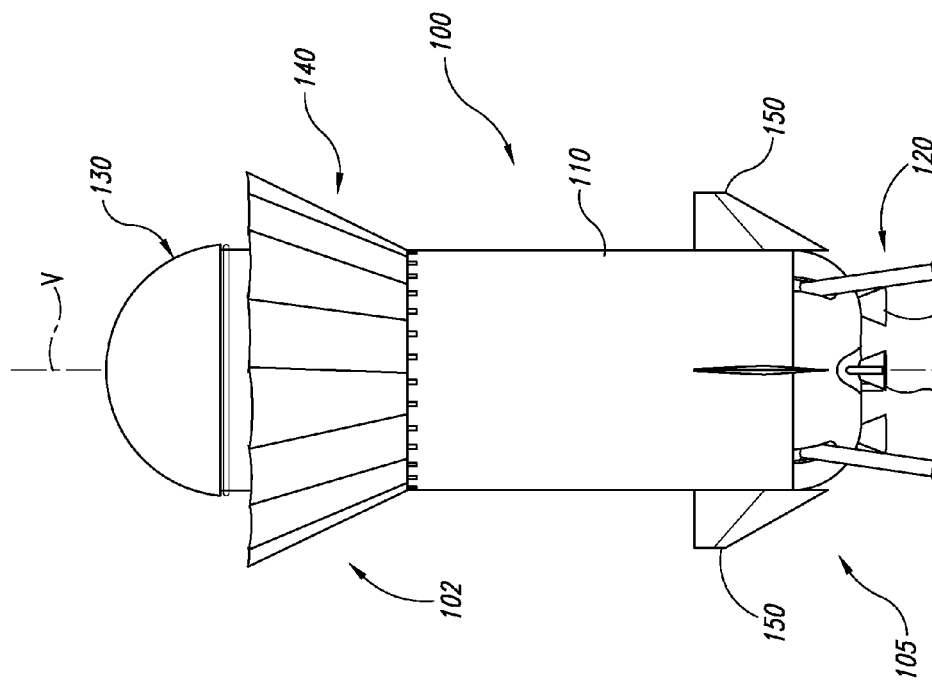
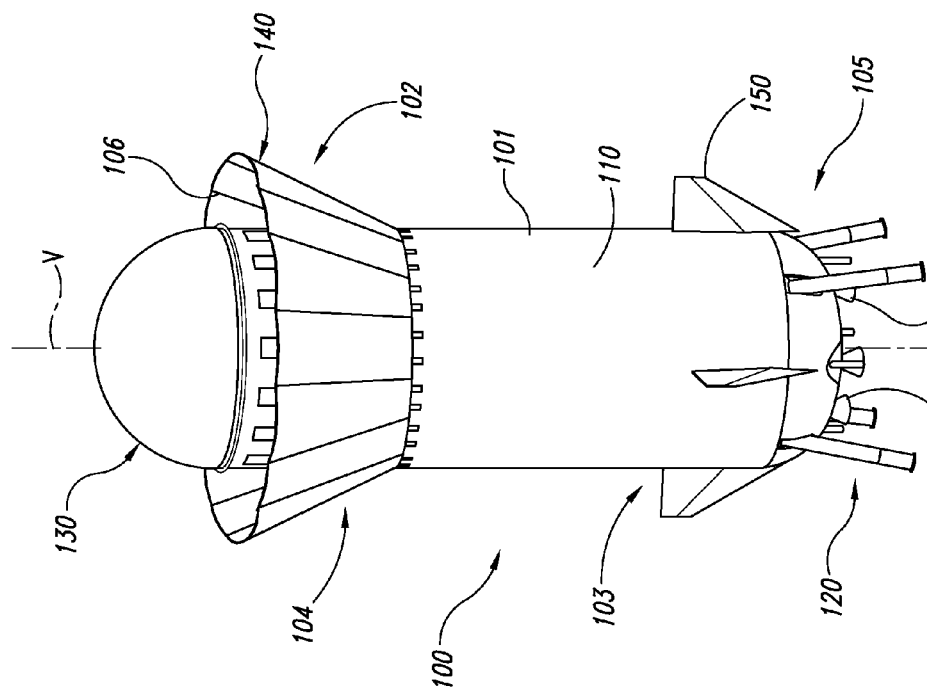

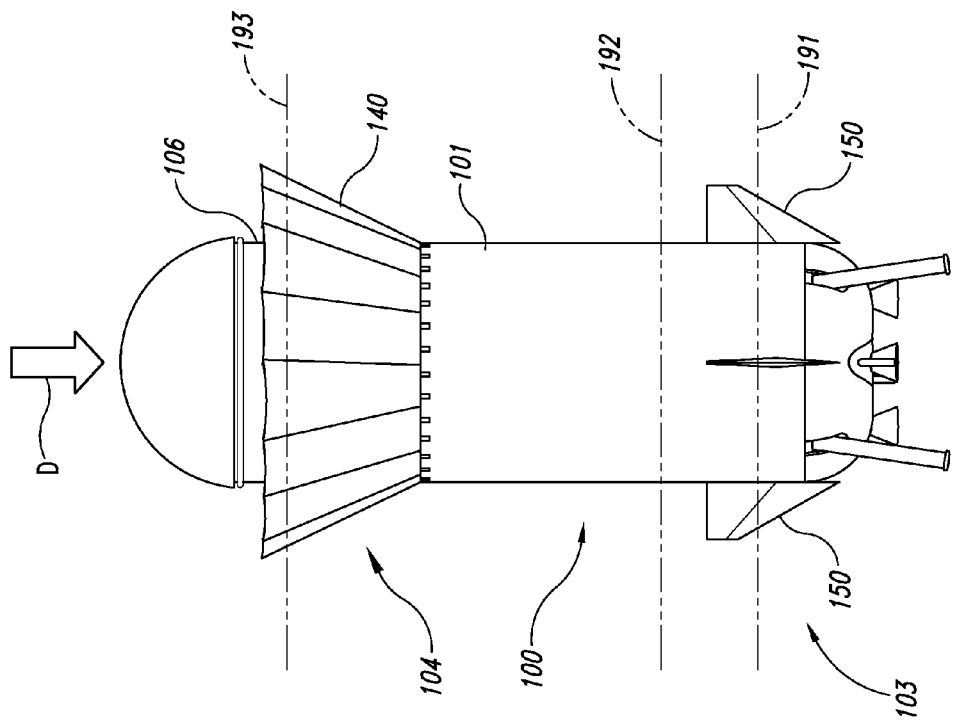
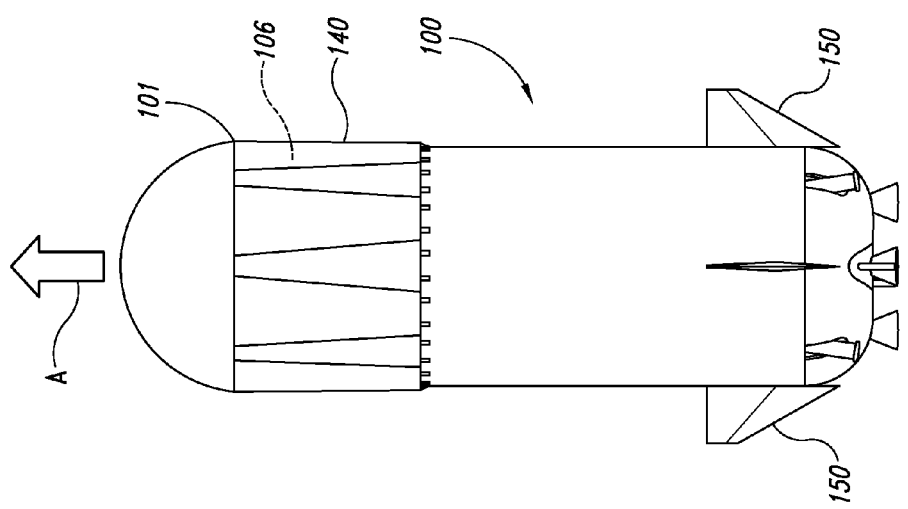

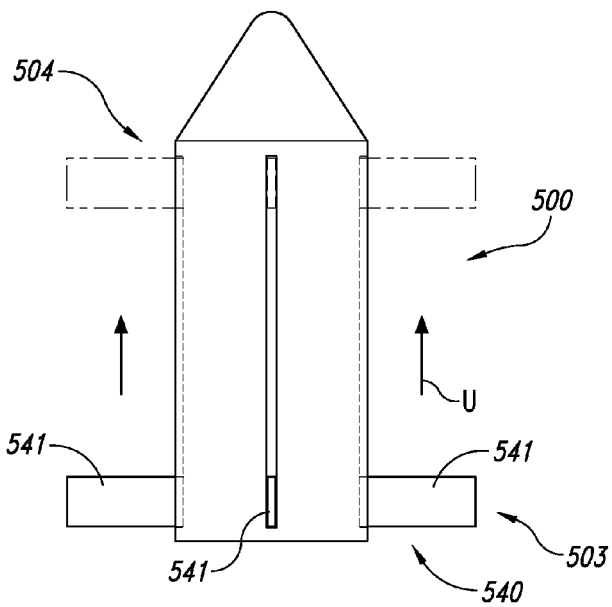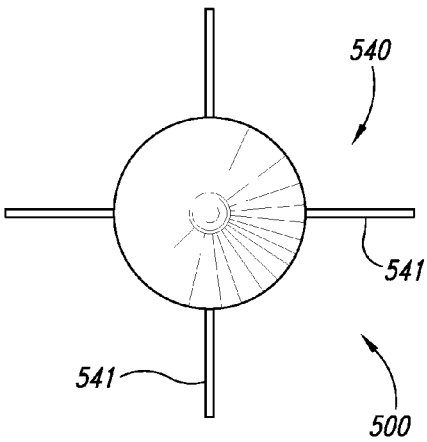
Fig. 5A  Fig. 5B
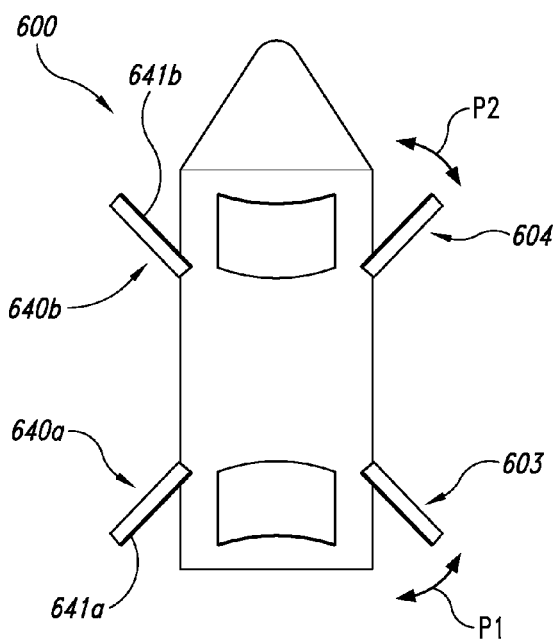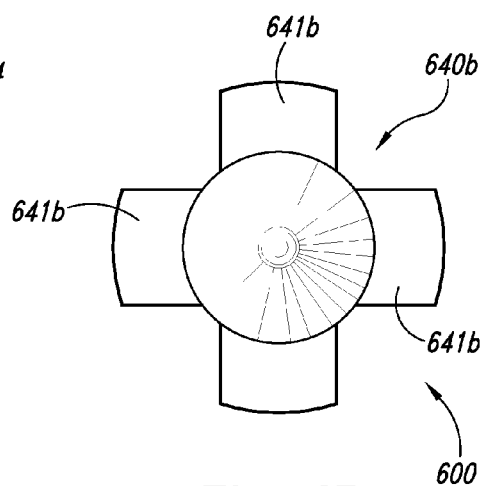
Fig. 6A  Fig. 6B

LAUNCH VEHICLES WITH FIXED AND DEPLOYABLE DECELERATION SURFACES, AND/OR SHAPED FUEL TANKS, AND ASSOCIATED SYSTEMS AND METHODS

CROSS-REFERENCE TO RELATED APPLICATIONS

The present application claims priority to U.S. Provisional Application 61/155,115 and U.S. Provisional Application 61/155,132, both filed Feb. 24, 2009, and both incorporated herein by reference.

TECHNICAL FIELD

The present disclosure is directed generally to launch vehicles with fixed and deployable deceleration surfaces, including flare surfaces, and associated systems and methods.

BACKGROUND

Rockets have been used for many years to launch human and non-human payloads into orbit. Such rockets delivered the first humans to space and to the moon, and have launched countless satellites into the earth's orbit and beyond. Such rockets are used to propel unmanned space probes and more recently to deliver structures, supplies, and personnel to the orbiting international space station.

One continual challenge associated with rocket missions is the reusability of the system. Aspects of the present disclosure are directed to addressing this challenge.

BRIEF DESCRIPTION OF THE DRAWINGS

FIGS. 1A and 1B illustrate a representative vehicle having a deployable flare surface in accordance with an embodiment of the disclosure.

FIGS. 2A and 2B illustrate a representative vehicle during ascent and descent, respectively, in accordance with an embodiment of the disclosure.

FIG. 46 is a partially schematic, side elevation view of the vehicle shown in FIG. 4A, with the deployable surfaces deployed.

FIGS. 5A and 5B are partially schematic, side elevation and plan views, respectively, of a vehicle having translating surfaces in accordance with an embodiment of the disclosure.

FIGS. 6A and 6B are partially schematic, side elevation and plan views, respectively, of a vehicle having two sets of deployable flare surfaces in accordance with an embodiment of the disclosure.

DETAILED DESCRIPTION

Figure 3A:
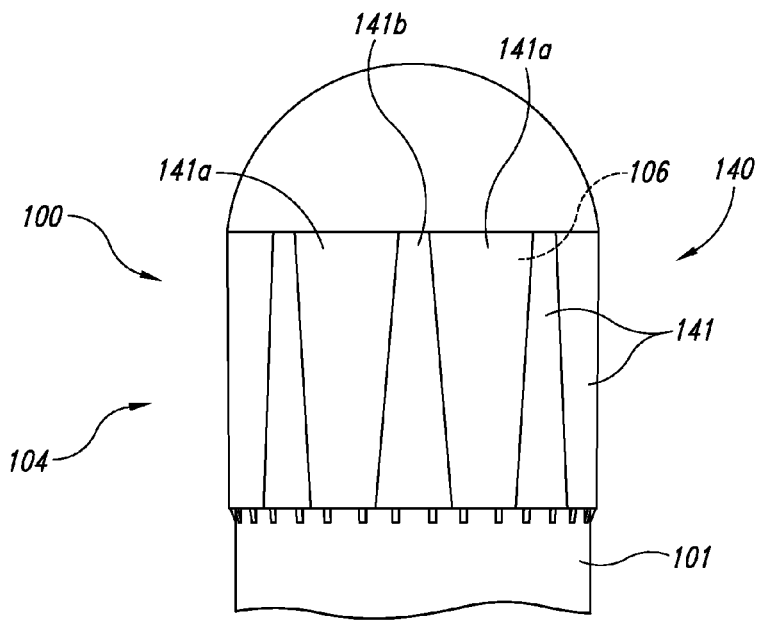
FIGS. 3A and 3B are enlarged illustrations of a portion of a representative vehicle illustrating a deployable flare surface in a stowed position and a deployed position, respectively.

The present disclosure is directed generally to launch vehicles (e.g., rockets) with fixed and deployable deceleration surfaces, and associated systems and methods. Several details describing structures and processes that are well-known and often associated with rocket flow surfaces are not set forth in the following description for purposes of brevity. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 1A-10.

FIG. 1A is a top isometric illustration of a vehicle 100 configured in accordance with an embodiment of the disclosure. FIG. 1B is a side elevation view of the vehicle 100 shown in FIG. 1A. Referring to FIGS. 1A and 1B, the vehicle 100 can be a rocket (e.g., an orbital or suborbital vehicle) that includes a propulsion module 110 carrying a payload module 130. The propulsion module 110 can include one or more engines having corresponding engine exhaust nozzles 111 positioned toward a first or aft end 105 of the vehicle 100. The vehicle 100 can be elongated along a longitudinal vehicle axis V, with an outwardly facing, exposed surface 101 having a first region 103 toward the first end 105, and a second region 104 positioned toward a second or forward end 102 of the vehicle 100. The vehicle 100 can include landing gear 120 positioned toward the first end 105 to allow the vehicle 100 to land in a tail-down orientation. The vehicle 100 can further include a deployable or otherwise movable deceleration surface (e.g., a flare surface) 140 positioned toward the second end 102 of the vehicle 100. The deployable surface 140 can be stowed during ascent and deployed during descent to stabilize and reduce the speed of the vehicle 100 during a tail-down descent and landing. In particular embodiments, the deployable deceleration surface 140 can elevate the aerodynamic center of pressure of the vehicle 100 (e.g., above the center of gravity of the vehicle 100) in such a manner as to improve stability and/or improve the ratio of vehicle aerodynamic lift to drag during a tail-down descent and landing. Fins 150 toward the aft end 105 of the vehicle 100 can act as stabilizers and/or control surfaces during ascent, and can also act as stabilizers and/or control surfaces during descent. Accordingly, the fins 150 can be operated in a forward direction (e.g., during ascent), and in a reverse direction (e.g., during descent), as described further in co-pending U.S. application Ser. No. 12/712,083, titled "BIDIRECTIONAL CONTROL SURFACES FOR USE WITH HIGH SPEED VEHICLES, AND ASSOCIATED SYSTEMS AND METHODS" and filed concurrently herewith.

In a particular embodiment, the payload module 130 can be configured to carry cargo and/or crew. In an embodiment shown in FIGS. 1A and 1B, the payload module 130 can have a hemispherical shape and in other embodiments, the payload module 130 can have other shapes.

In a particular embodiment, the vehicle 100 includes five engines internal to the vehicle 100 (and not visible in FIGS. 1A and 1B), each having a corresponding engine exhaust 111.

The engines are used during the boost phase to propel the vehicle 100 upwardly (e.g., vertically, with or without a downrange component). Optionally, the engines can also provide thrust vectoring to steer the vehicle 100 during the boost phase, alone or in combination with other control systems.

After the engines have completed the boost phase, the deployable surface 140 can be deployed to slow the descent of the vehicle 100. The deployable surface 140 can improve vehicle stability as the vehicle 100 descends (tail-down) by increasing vehicle drag and by reducing the terminal velocity of the vehicle 100 before the engines restart prior to a vertical landing. In a particular embodiment, the deployable surface 140 is used only once during flight, and is then retracted by the ground crew after the vehicle 100 has landed. The fins 150 can be used to control and steer the vehicle 100 during descent and landing. Accordingly, the vehicle 100 can be steered directly back to the site from which it was launched. In other embodiments, the vehicle 100 can be steered to other sites. In any of these embodiments, as the vehicle 100 approaches the landing site, the engines can be restarted to further slow the vehicle 100 down. The landing gear 120 are then deployed for final touchdown.

FIG. 2A is a partially schematic, side elevation view of an embodiment of the vehicle 100 during its ascent, indicated by arrow A. During the ascent phase, the deployable surface 140 (which forms part of the external surface 101) is stowed and can accordingly be positioned flat against an underlying surface 106 of the vehicle 100, and generally flush with the rest of the external surface 101. During the ascent phase, the landing gear 120 (FIGS. 1A, 1B) are stowed.

FIG. 2B illustrates the vehicle 100 during its descent phase, indicated by arrow D. During descent, the deployable surface 140 is deployed, e.g., by pivoting the surface 140 so that it expands outwardly from the underlying surface 106. As discussed above, this configuration is expected to slow the vehicle 100 down and can also stabilize the vehicle. For example, as noted above deploying the surface 140 can shift the center of pressure acting on the vehicle 100 upwards (e.g., above the vehicle center of gravity) so that gravitational forces on the vehicle 100 tend to stabilize perturbations that may be caused by aerodynamic forces acting on the vehicle 100.

One effect of deploying the surface 140 is to increase the cross-sectional area or planform footprint of the vehicle 100 at the second region 104, relative to the first region 103. For example, the cross-sectional area of the vehicle 100 taken at a first station 191 (including the cross-sectional area of the fins 150) or a second station 192, both located within the first region 103, will be less than the cross-sectional area of the vehicle 100 at a third station 193, located in the second region 104 when the deployable surface 140 is deployed. This change in cross-sectional area can be temporary, by virtue of the ability to subsequently stow or otherwise move the deployable surface 140. In other embodiments described later with reference to FIGS. 7-10, the increased cross-sectional area can be a fixed part of the vehicle external geometry.

FIG. 3A is a partially schematic, side view of the second region 104 of the vehicle 100, with the deployable surface 140 stowed, for example, during a boost or ascent phase of the vehicle 100. The deployable surface 140 can include multiple, deployable petals 141 or other suitable surfaces or surface elements. In the stowed configuration, the petals 141 are closed up against the underlying surface 106 of the vehicle 100. Accordingly, the petals 141 can be formed from sections of a cylinder so as to conform to the shape of the cylindrical external surface 101. In other embodiments, the petals 141 can have other shapes. In any of these embodiments, outer petals 141a can alternate with and overlap intermediate inner petals 141b.

Figure 3B:
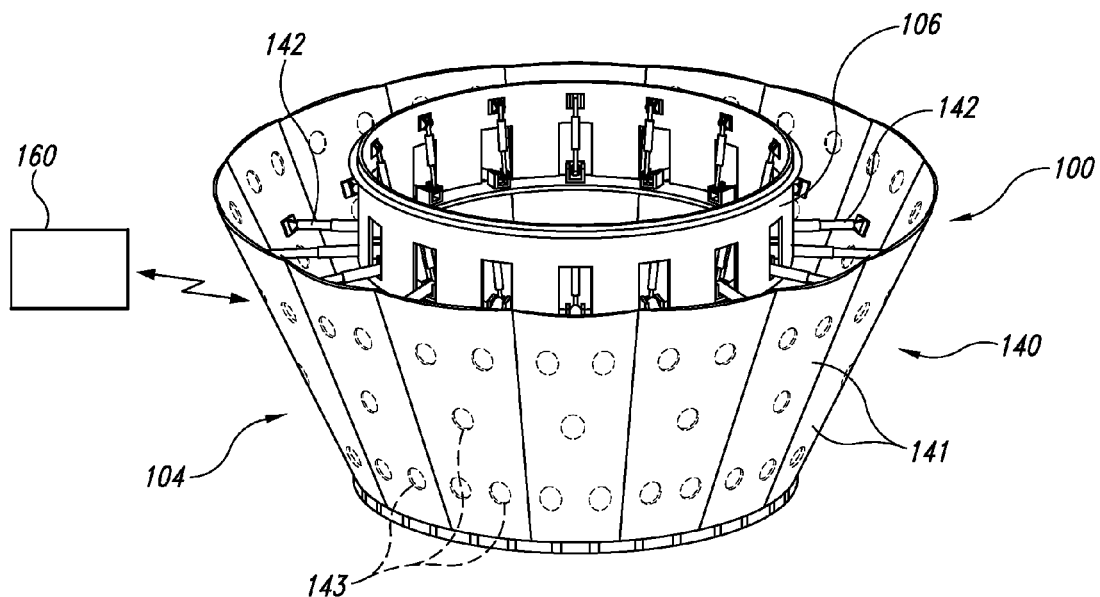

FIG. 3B is a partially schematic, top isometric illustration of the second region 104 of the vehicle 100, illustrating the deployable surface 140 in a deployed configuration. In this configuration, the petals 141 have been pivoted outwardly from the underlying surface 106 of the vehicle 100, for example, via one or more actuators 142. In a particular embodiment, adjacent petals 141 can overlap each other when stowed, and can overlap or abut each other when deployed. In other embodiments, the petals 141 can be spaced apart or at least partially spaced apart when deployed. The particular arrangement selected for the deployable surface 140 can depend upon the level of braking expected to be provided by the deployable surface 140, integration with the vehicle 100, and/or other factors.

In a particular embodiment, the deployable surface 140 includes 16 petals 141, each deployed by a separate pneumatic, hydraulic, electric or other actuator. The petals 141 can overlap with each other when stowed, with a first set of eight petals 141 positioned outside and a second set of eight petals 141 positioned inside and interleaved with petals of the first set, so that no significant gaps exist between adjacent petals 141 when the flare 140 is fully deployed. The vehicle 100 can include retention latches or other features that hold the petals 141 in the stowed position before the command is given to open them. In a particular embodiment, the second region 104 of the vehicle 100 can include composite sandwich panels, backed by aluminum ring frames for additional stiffness. The petals 141 can also be formed from composite sandwich panels. In other embodiments, any of these structures can have other compositions.

In a particular embodiment, the individual petals 141 are moved in concert, so that each one moves by the same amount, at the same rate and in the same direction (e.g., outwardly or inwardly) as the others. In other embodiments, the individual petals 141 of the deployable surface 140 can be individually movable and/or controllable. In such embodiments, the petals 141 can be moved relative to each other at different rates, by different amounts and/or in different directions, e.g., to steer the vehicle 100 in addition to slowing it down. The motion of the petals 141 can be controlled by a controller 160. In one embodiment, the controller 160 is an electromechanical device that is carried by the vehicle 100. In other embodiments, the controller 160 is a digital or computer-based device 160 carried by the vehicle 100 or based on the ground, and having computer-readable media containing appropriate instructions. The controller 160 can receive input signals from any of a variety of sensors (e.g., an accelerometer, a GPS sensor, an altitude sensor, a pressure sensor, or a time sensor (e.g., a clock)), on the basis of which the controller 160 issues instructions for operating the petals 141. The controller 160 can control other vehicle functions as well, e.g., the operation of the engines, landing gear and control surfaces.

As discussed above, the petals 141 can sealably engage with each other when deployed. In other embodiments, neighboring petals can be spaced apart from each other when deployed, forming axially extending gaps. In still another embodiment, the petals 141 can be vented. For example, the petals 141 can include vent openings 143 (shown in dashed lines in FIG. 3B) that allow air to pass through the petals 141. The vent openings 143 can be arranged in a checkerboard or other suitable pattern. In further aspect of this embodiment, individual vent openings 143 can be selectively opened and closed (e.g., via an actuated panel, iris, or other suitable device) to control the flow of air through the openings 143. In this manner, the drag created by the deployable surface 140 can be controlled. In a further aspect of this embodiment, the vent openings 143 at one circumferential location can be opened and those at another circumferential location can be closed to provide a differential drag that can in turn be used to steer the vehicle 100.

Figure 4A:
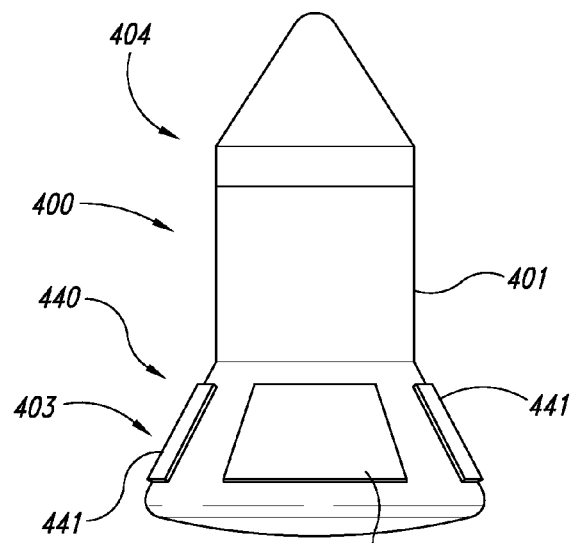
FIG. 4A is a partially schematic, side elevation view of a vehicle having stowed deployable surfaces configured in accordance with another embodiment of the disclosure.
Figure 4B:
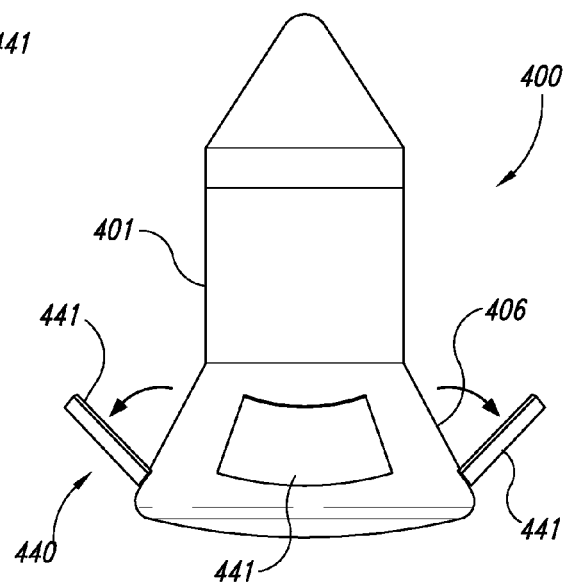
FIG. 4C is a partially schematic, plan view of the vehicle shown in FIG. 4B, with the deployable surfaces deployed.
Figure 4C:
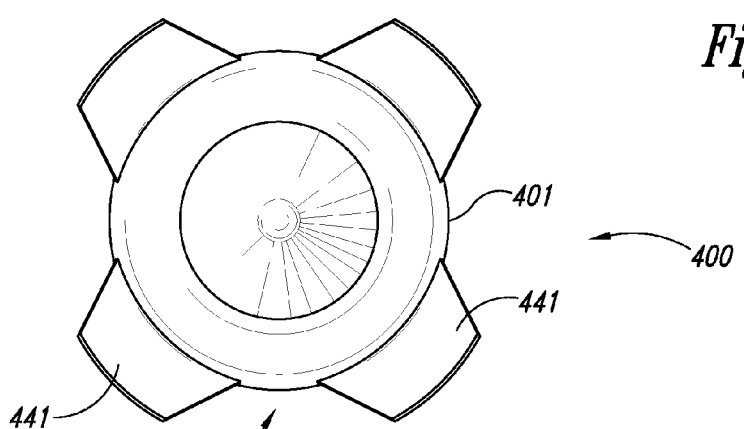

In the embodiments described above with reference to FIGS. 1A-3B, the deployable surface is positioned toward the upper or second end of the vehicle. FIG. 4A is a partially schematic, side elevation view of a vehicle 400 having a deployable surface located toward the lower end in accordance with another embodiment of the disclosure. In one aspect of this embodiment, the vehicle 400 has an external surface 401 with a first or lower region 403 having an outwardly flared shape, and a second or upper region 404 above the first region 403. The deployable surface 440 located at the first region 403. The deployable surface 440 can include four deployable panels 441 (three of which are visible in FIG. 4A) which are shown in the stowed position. FIGS. 4B and 4C illustrate side elevation and plan views, respectively, of the vehicle 400, with the deployable surface 440 in the deployed position. In this position, the panels 441 are pivoted outwardly away from an underlying surface 406 of the vehicle 400 to increase the cross-sectional area of the vehicle 400 beyond that produced by the flared outer surface 401 at the first region 403. This arrangement can further enhance the stability of the flared body shape on descent.

FIG. 5A is a partially schematic, side elevation view of a vehicle 500 having a deployable surface 540 that translates rather than pivots during operation. FIG. 5B is a partially schematic, top plan view of the vehicle 500 shown in FIG. 5A. Referring now to FIGS. 5A and 5B together, the deployable surface 540 can include multiple fin or vane elements 541 (four are shown in FIGS. 5A and 5B) that are positioned toward a first or lower region 503 of the vehicle 500 during ascent. Accordingly, the deployable surfaces 540 can provide stability and, optionally, control of the vehicle 540 from a position below the vehicle center of gravity. Prior to or during a tail-down descent, the fin elements 541 translate upwardly as indicated by arrows U so as to be located at a second or upper region 504 of the vehicle. In this position, the fin elements 541 can act to move the center of pressure of the vehicle 500 upwardly, for example, above the vehicle center of gravity. Because the fin elements 541 are lift-generating devices, the vehicle will typically cant over from a purely vertical inclination to provide an angle of attack that allows the fins to generate sufficient lift. The vehicle 500 can return to a fully vertical position prior to touching down. The vehicle 500 can include tracks, rails, or other suitable guide structures to guide the translational motion of the fin elements 541.

FIGS. 6A and 6B are partially schematic, side elevation and top plan views, respectively, of a vehicle 600 having multiple deployable surfaces that operate in concert to control the location of the vehicle center of pressure relative to the vehicle center of gravity. In particular, the vehicle 600 can include a first or lower deployable surface 640a positioned at a first or lower region 603 of the vehicle 600, and a second or upper deployable surface 640b positioned at a second or upper region 604 of the vehicle 600. The first deployable surface 640a can include first flare elements 641a, and the second deployable surface 640b can include second flare elements 641b. Both the first flare elements 641a and the second flare element 641b can deploy outwardly relative to the vehicle 600 and then return to a stowed position as indicated by arrows P1 and P2, respectively. During ascent, the second flare elements 641b can be stowed generally parallel to the external surface of the vehicle 600, while the first flare elements 641a are pivoted outwardly to provide stability and/or control. In a particular embodiment, the first flare elements 641a can remain stowed during ascent, unless needed to provide additional stability. Such a need may arise if one or more engines fail during ascent. During descent, the relative orientations of the first and second flare elements 641a, 641b can be reversed. In particular, the first flare elements 641a can be stowed generally parallel to the exterior surface of the vehicle 600, while the second flare elements 641b are deployed to provide a center of pressure movement generally similar to that described above with reference to FIGS. 1A-2B.

In several of the embodiments described above, deployable surfaces control the change in center of pressure between vehicle ascent and vehicle descent. In other embodiments, described below with reference to FIGS. 7-10, the overall shape of the vehicle can remain fixed, but can have a cross-sectional shape variation between the lower end of the vehicle and the upper end of the vehicle that provides increased drag during descent when compared to a conventional cylindrical or upwardly and inwardly tapered rocket shape. Accordingly, the external surface of the vehicle can be positioned (e.g., fixed) or positionable (e.g., movable) to achieve the desired cross-sectional shape variation.

Figure 7:
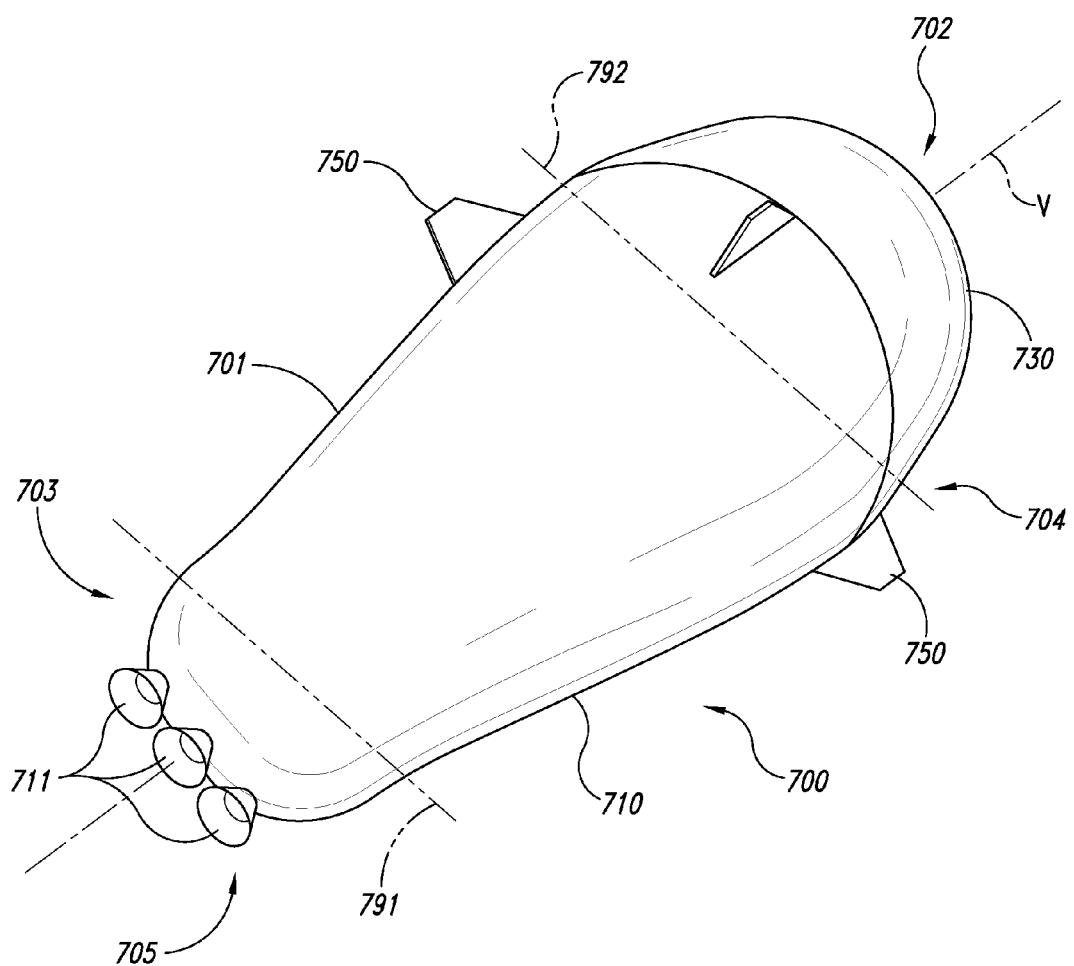
FIG. 7 is a partially schematic, isometric illustration of a vehicle having an upwardly and outwardly tapered shape in accordance with an embodiment of the disclosure.

FIG. 7 is a partially schematic, isometric illustration of a launch vehicle 700 elongated along a vehicle axis V between a first end 705 and a second end 702. The vehicle 700 includes a payload module 730 toward the second end 702, and a propulsion module 710 with one or more exhaust nozzles 711 toward the first end 705. In a particular embodiment, the vehicle 700 includes three exhaust nozzles 711, the outer two of which are fixed, and the center one of which is vectorable for vehicle control. In other embodiments, the vehicle 700 can have other numbers and/or arrangements of engines and associated nozzles. The vehicle 700 can also include fins 750 that may be actuated to provide additional vehicle control during both ascent and descent. An external surface 701 of the vehicle 700 includes a first region 703 toward the first end 705, and a second region 704 toward the second end 702. The cross-sectional area of the vehicle 700 bounded by the external surface 701 increases along the vehicle axis V from the first region 703 to the second region 704. Accordingly, a cross-sectional area of the vehicle 700 at a first station 791 in the first region 703 is smaller than the corresponding cross-sectional area at a second station 792 located in the second region 704.

The shape of the external surface 701 of the propulsion module 710 and the payload module 730 can be selected to produce the desired drag characteristics for both ascent and descent. In particular, the shape of the external surface 701 is generally selected to reduce or minimize buffet during ascent, particularly at transonic speeds, while providing aerodynamic forces that stabilize the vehicle during tail-down descent.

One characteristic of the arrangement described above with reference to FIG. 7 is that it can eliminate the need for deployable deceleration surfaces. Accordingly, it is expected that this arrangement may reduce the overall vehicle weight. Conversely, an expected advantage of the deployable surfaces described above with reference to FIGS. 1A-6B is that they may provide more decelerating force than the drag produced by the outer mold line (OML) of the vehicle 700, thereby reducing the amount of fuel used by the engines to decelerate the vehicle during descent. This arrangement can offset or partially offset the additional weight expected to result from the deployable surfaces. The particular selection of deceleration surfaces (e.g., deployable surfaces or fixed, flared surfaces) can depend on a variety of factors, including the mission that the vehicle is to undertake, and the payload the vehicle is to carry. These two arrangements need not be mutually exclusive. Accordingly, in other embodiments, deployable surfaces may be combined with fixed OML shapes to provide the desired combination of deceleration forces and vehicle weight.

Figure 8A:
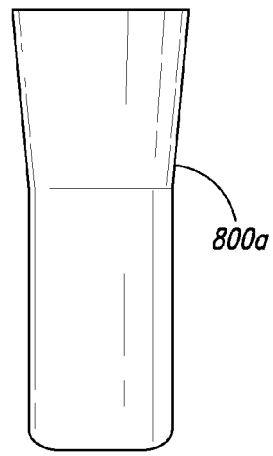
FIGS. 8A-8F are partially schematic, side elevation views of portions of vehicles having upwardly and outwardly tapered shapes in accordance with further embodiments of the disclosure.
Figure 8B:
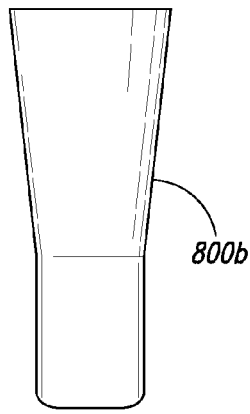
Figure 8C:
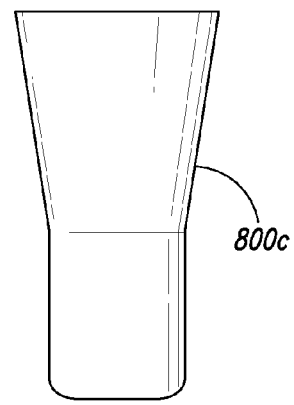
Figure 8D:
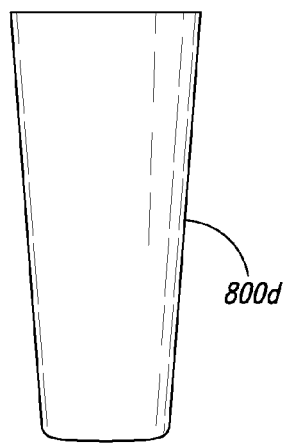
Figure 8E:
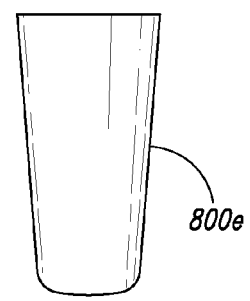
Figure 8F:
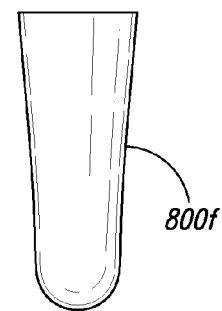

Whether used alone or in combination with deployable deceleration surfaces, the fixed outer surface of the vehicle can have a variety of shapes that are expected to increase drag during vehicle descent, without unduly adding to vehicle drag during ascent. FIGS. 8A-8F illustrate a representative selection of such vehicle shapes. For purposes of illustration, the payload modules and engine/nozzle arrangements, as well as other external vehicle features (e.g., fins) are not shown in FIGS. 8A-8F. During operation, the payload module may descend separately from the propulsion module as shown in FIGS. 8A-8F, or it can remain attached to the propulsion module during descent, as shown in FIG. 7. FIGS. 8A-8C illustrate corresponding vehicles 800a, 800b, 800c, respectively, having OML surfaces that vary in a non-monotonic manner over the length of the corresponding vehicle axis. In particular, these shapes include a generally cylindrical portion toward the lower end of the vehicle, and an outwardly, upwardly tapering section toward the upper end of the vehicle. The taper can be linear (e.g., conical) or nonlinear (e.g., concave or convex). In other embodiments, illustrated in FIGS. 8D, 8E and 8F, corresponding vehicles 800d, 800e and 800f, respectively, include external surfaces that taper in a continuous manner from the lower end of the vehicle to the junction with the corresponding payload capsule (not shown). The particular divergence angle of the surfaces relative to the vehicle axis can be selected in a manner that depends, for example, on the vehicle mission and the vehicle payload to provide a large amount of drag during descent, and a small and incremental increase in drag during ascent.

In any of the foregoing embodiments, fuel is carried in tanks positioned within (or forming part of) the external surface of the vehicle. Liquid propellant tanks configured in accordance with particular embodiments of the present disclosure, and suitable for launch vehicles, have shapes that are customized so as to (a) reduce the dynamic effects of sloshing fluid within the tank, and (b) fit within the upwardly, outwardly tapered vehicle OML. For example, the tank OML can be varied by modulating the radius of the tank so as to reduce the destabilizing effects of the sloshing fluid. In a further particular aspect of this embodiment, the fuel tank can include internal slosh baffles that are molded into a plastic tank liner. This arrangement can eliminate the need to mechanically fasten baffles inside the tank. In other embodiments, the baffles can be formed from within the tank. In a further aspect of the foregoing embodiments, the shape of the tank can be configured to enhance and/or optimize the propellant's center of mass location within the vehicle so as to reduce the destabilizing effects that might otherwise result when liquid propellant within the tank sloshes during normal operations.

Figure 9:
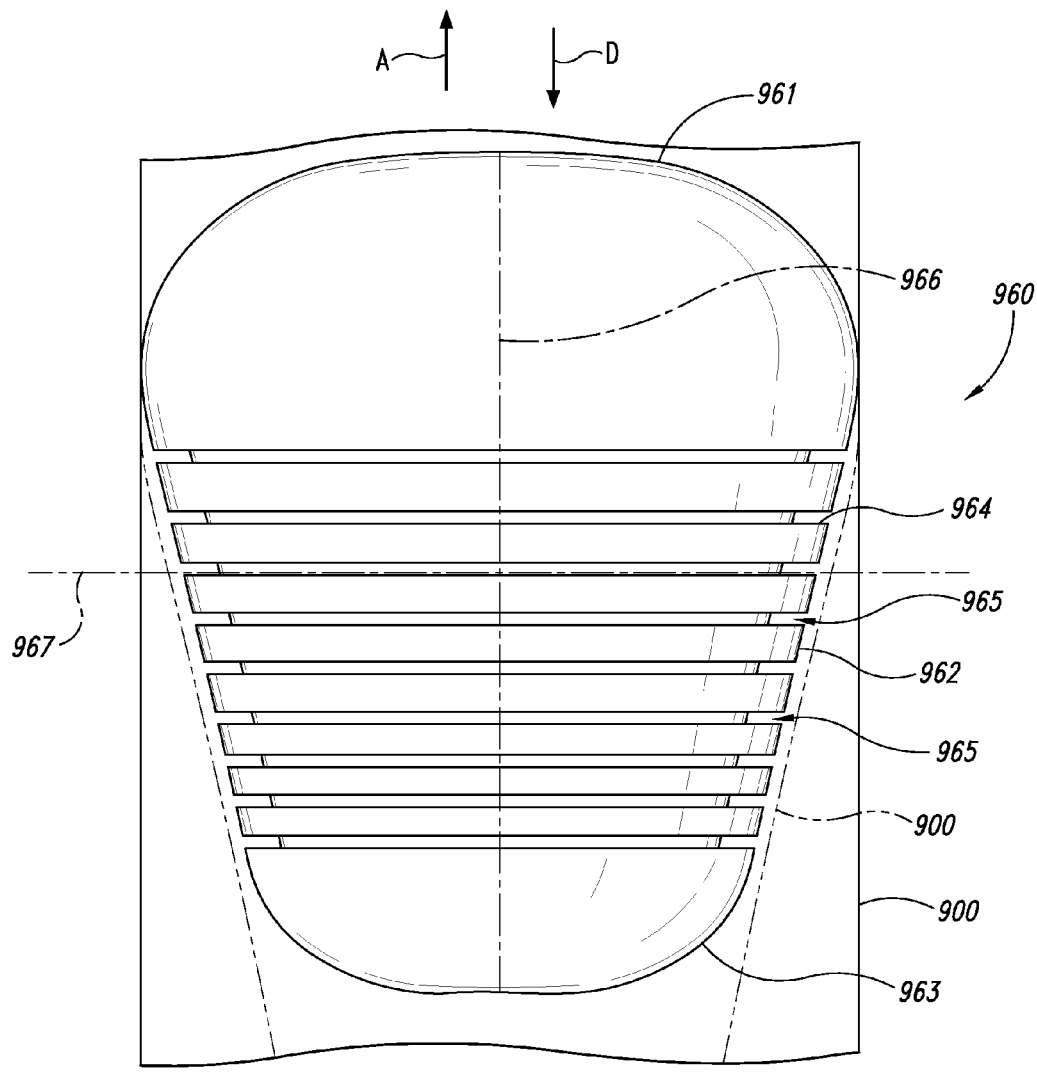
FIG. 9 is a partially schematic, isometric illustration of a fuel tank having a shape and features configured in accordance with still another embodiment of the disclosure.

FIG. 9 is a partially schematic, side elevation view of a portion of a vehicle 900 (e.g., a rocket) having a fuel tank 960 configured in accordance with a particular embodiment of the disclosure. The vehicle 900 can have a generally cylindrical shape as shown in solid lines in FIG. 9, or the vehicle can have any of the upwardly, outwardly tapered shapes described above, as shown in dashed lines in FIG. 9. In a particular aspect of this embodiment, the liquid propellant tank 960 has a larger forward or upper region 961 with a generally dome-shaped external surface, and smaller aft or lower region 963 also with a generally dome-shaped external surface, but with a smaller diameter than that of the forward region 961. The upper and lower regions 961, 963 can be positioned on opposite sides of an intermediate region 962 having a generally conical shape with a radius that varies linearly with length. Accordingly, the tank 960 can have an overall "pear" type shape, and can be symmetric about a tank longitudinal midline axis 966. However, the shape of the tank 960 is asymmetric relative to a lateral midline axis 967. This shape can be selected based on the available height and volume inside the vehicle 900, by the desire to adjust the propellant center of mass from high in the vehicle 900 during ascent to lower in the vehicle 900 during descent, by the shape (e.g., tapered shape) of the vehicle OML, and/or by the desire to modulate the slosh damping requirement for various propellant fill fractions.

As discussed above, the vehicle 900 can be configured to move in a forward direction (e.g., nose first) during ascent, as indicated by arrow A, and can move in an aft direction (e.g., tail first) during descent, as indicated by arrow D. In at least some embodiments, it is desired to keep the propellant center of mass high in the vehicle 900 during ascent. In addition, fuel slosh is less of an issue at the higher fill fractions associated with ascent. Accordingly, the radius of the forward region 961 can be relatively large relative to the width or diameter of the vehicle 900. As the propellant free surface drops below the forward region 961 and into the intermediate region 962, the propellant center of mass drops more rapidly because the propellant generally flows out of the tank 960 at a constant volumetric rate, and the tank radius reduces linearly with length. This brings the center of mass lower in the vehicle 900 to a more desired location for descent stability. The center of mass can accordingly drop more rapidly during later phases of ascent and/or during descent.

In a particular aspect of an embodiment shown in FIG. 9, the fuel tank 960 can include features that restrict the tendency for fuel to slosh within the tank 960. For example, the tank 960 can include baffles 964 that extend inwardly into the interior region of the tank 960 to control (e.g., reduce) sloshing. Because slosh frequency and sloshing mass are both nonlinear functions of tank radius, the decreasing tank radius results in a reduction of the sloshing mass and an increase in the slosh frequency, both of which reduce the slosh damping required to maintain vehicle control stability. By lowering the propellant center of mass at lower fill fractions (when slosh is more critical), the moment arm from the propellant center of mass to the vehicle center of mass is shortened and accordingly, the slosh has a reduced destabilizing effect on the vehicle 900. Due to the tank shape, the propellant free surface drops nonlinearly during a constant outflow rate, and slosh amplitude takes some amount of time to develop. In particular embodiments, the spacing between neighboring slosh baffles 964 can be varied between the forward region 961 and the aft region 963, for example, to account for the above non-linearities. In other embodiments, the baffle spacing can be constant. Because the aft region 963 holds a much smaller amount of propellant volume, it is less likely that baffles 964 are required in this region, which can simplify the mold design and fabrication.

In a particular embodiment, the tank 960 can be formed from a molded plastic liner and graphite/epoxy overwrap. The liner can prevent contact between the fuel and the overwrap. Accordingly, the tank 960 can be used with fuels (e.g., peroxide fuels) that would otherwise be incompatible with the overwrap. In other embodiments, the tank 960 can carry other fuels and/or other constituents.

In any of the foregoing embodiments, it may be difficult to install traditional style baffles into the tank 960 because (in at least some embodiments), the tank liner is fabricated in one piece by rotational molding. Accordingly, one approach is to mold the slosh baffles 964 as part of the liner. The mold used for this operation can have inwardly extending flanges that form the baffles 964 and that are withdrawn in an outward direction when the mold is opened, so as to allow the tank 960 to be removed. This approach creates hollow cavities (e.g., gaps 965) open to the outer mold line of the liner. These cavities or gaps 965 can be filled with a low density foam or other material to provide some rigidity for the baffles 964 projecting into the tank, and to provide a smooth outer surface against which to filament-wind the graphite/epoxy overwrap.

Figure 10:
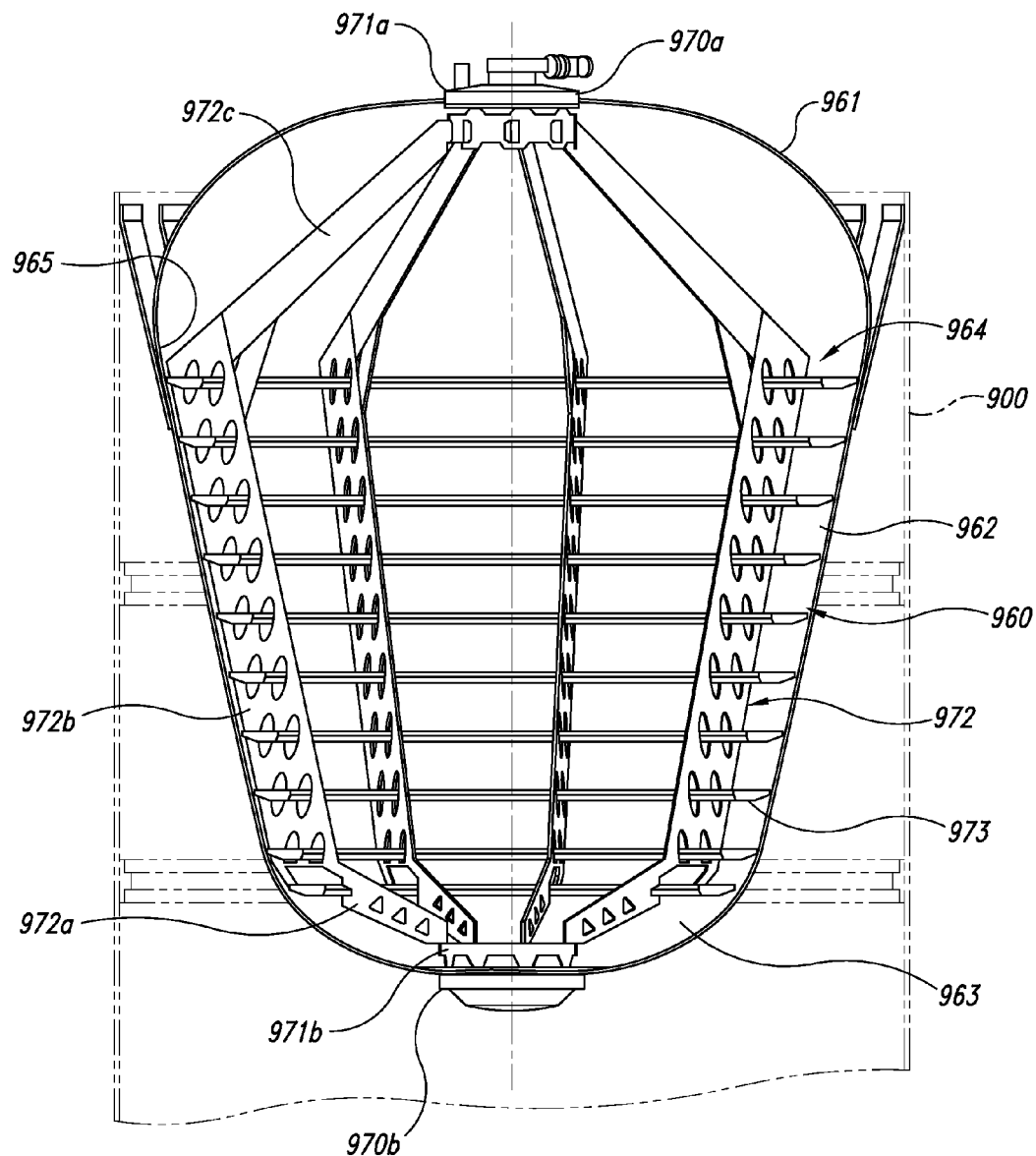
FIG. 10 is a partially cut-away side elevation view of a fuel tank configured in accordance with still another embodiment of the disclosure.

FIG. 10 is a partially schematic, partially cut-away illustration of a fuel tank 960 positioned in a vehicle 900 and having baffles 964 arranged and constructed in accordance with another embodiment of the disclosure. In one aspect of this embodiment, the fuel tank 960 is pre-formed (e.g., by rotational molding), and the baffles 964 are added afterwards. The tank 960 can include one or more manhole covers 970 (shown as a top manhole cover 970a and a bottom manhole cover 970b) to allow access to the interior of the tank 960. The covers 970 can also support appropriate fuel entry and/or exit ports in particular embodiments. Support rings 971 (shown as an upper support ring 971a and a lower support ring 971b) are positioned at the inside of the tank 960 and can be attached proximate to or directly to the manhole covers 970. The baffles 964 are connected between and supported by the upper support ring 971a and the lower support ring 971b. Accordingly, the baffles 964 can include axial baffle elements 972 that extend between the support rings 971a, 971b, and lateral baffle elements 973 that are connected to and extend between neighboring axial baffle elements 972. The axial baffle elements 972 can have a flat, panel-type shape and can form "grapefruit" baffles. In particular embodiments, the axial baffle elements 972 can be connected only to the upper support ring 971a and the lower support ring 971b. The lateral baffle elements 973 can also have a flat, panel-type shape, and can be arranged to form rings positioned within an inner wall 965 of the tank 960. The lateral baffle elements 973 can be connected only to the axial baffle elements 972. Accordingly, the baffle elements 972, 973 can reduce or prevent sloshing, without contacting the inner wall 965 of the tank 960. The axial baffle elements 972 and/or the lateral baffle elements 973 can be perforated, and can be formed from thin, lightweight materials (e.g., a suitable metal).

In a particular embodiment, the baffles 964 can be positioned within the tank by opening the upper manhole cover 970a and lowering an operator into the interior volume of the tank 960. The operator can receive the elements of the baffle 964 (e.g., the axial baffle elements 972 and the lateral baffle elements 973) and attach the elements to each other and to the support rings 971a, 971b. In a particular embodiment, the axial baffle elements 972 can initially include multiple components, e.g., a lower component 972a, an intermediate component 972b, and an upper component 972c. These components 972a-972c can be lowered separately into the tank 960 and assembled in situ by the operator within the tank. To prevent contact between the operator and the inner wall 965 of the tank 960, the operator can be supported by a trapeze or other suitable platform suspended from a gantry or other structure outside the tank. Depending upon the size of the access ports into the tank 960, certain of the components 972a-972c can be pre-attached prior to being lowered into the tank 960. For example, the lower component 972a and the upper component 972b can be attached to each other in a particular embodiment. If the access port is sufficiently large, the entire axial baffle element 972 can be lowered as a unit into the tank 960. The lateral baffle elements 973 can initially be segmented, e.g., with individual segments connected between neighboring axial baffle elements 973.

From the foregoing, it will be appreciated that specific embodiments of the disclosure have been described herein for purposes of illustration, but that the disclosure may include other embodiments as well. For example, the deployable surfaces 140 can have petals 141 with shapes and/or arrangements that are different than those shown and described above. In another example, further features of the fuel tank can be integrated with the launch vehicle. For example, at least part of the external surface of the launch vehicle can be formed by an external surface of the fuel tank. Certain aspects of the disclosure described in the context of particular embodiments may be combined or eliminated in other embodiments. For example, the tapered fuel tank described above with reference to FIGS. 9 and 10 can be combined with any of the disclosed tapered external vehicle surfaces, and/or the tapered external surfaces can be combined with any of the deployable deceleration surfaces described above. Further, while advantages associated with certain embodiments have been described in the context of those embodiments, other embodiments may also exhibit such advantages and not all embodiments need necessarily exhibit such advantages to fall within the scope of the present disclosure. Accordingly, the disclosure can encompass other embodiments not expressly shown or described herein.

We claim:

1. An aerospace system, comprising:
   a vertical take-off and landing launch vehicle having a first end and a second end generally opposite the first end, the launch vehicle being elongated along a vehicle axis extending between the first end and the second end;
   a propulsion system carried by the launch vehicle and having at least one nozzle positioned at the first end of the launch vehicle to launch the launch vehicle;
   a deployable and stowable, outwardly facing surface carried by the launch vehicle, the deployable surface being moveable relative to the launch vehicle between a stowed position and a deployed position, the deployable surface being configured to produce a first vehicle cross-sectional area generally normal to the vehicle axis when stowed and a second vehicle cross-sectional area generally normal to the vehicle axis when deployed, the second cross-sectional area being closer to the second end of the launch vehicle than the first end and being greater than the first cross-sectional area and greater than all vehicle cross sectional areas generally normal to the vehicle axis located between the first end and the second cross-sectional area; and
   a controller carried by the launch vehicle and configured to stow the deployable surface during vehicle ascent, and to deploy the deployable surface during vehicle descent.

2. The system of claim 1 further comprising a sensor operatively coupled to the controller to provide a signal indicative of a change between vehicle ascent and vehicle descent.

3. The system of claim 1 wherein the deployable surface includes multiple deployable panels, with neighboring panels having different circumferential locations.

4. The system of claim 3 wherein neighboring panels overlap.

5. The system of claim 4 wherein the overlapping panels include multiple outer panels and multiple inner panels, with an individual inner panel positioned between and radially inwardly from two adjacent outer panels.

6. The system of claim 1 wherein the deployable surface is pivotably moveable relative to the launch vehicle.

7. The system of claim 1 wherein the deployable surface is generally aerodynamically sealed.

8. The system of claim 1 wherein the deployable surface has air passages positioned to allow air to flow through the deployable surface.

9. The system of claim 1 wherein the deployable surface includes a vane.

10. The system of claim 1 wherein the deployable surface includes a flare.

11. The system of claim 1 wherein the deployable surface includes multiple elements and wherein the controller is programmed with instructions to move an individual element independently of another individual element.

12. The system of claim 1 wherein the deployable surface is a second deployable surface, and wherein the vehicle includes a first deployable surface positioned toward the first end of the vehicle, and wherein the controller is programmed with instructions to control the motions of the first and second deployable surfaces independently.

13. An aerospace system, comprising:
- a vertical take-off and landing launch vehicle having a first end and a second end generally opposite the first end, the launch vehicle being elongated along a vehicle axis extending between the first end and the second end;
- at least one outwardly facing, exposed surface carried by the launch vehicle, the exposed surface having a first region that is positioned or positionable to produce a first exposed surface area per unit length along the vehicle axis toward the first end of the vehicle, the exposed surface having a second region positioned or positionable to produce a second exposed surface area per unit length along the vehicle axis toward the second end of the vehicle, the second surface area per unit length being greater than the first surface area per unit length, and greater than any exposed surface area per unit length located between the first end and the second exposed surface area per unit length;
- wherein the second region is movable relative to the launch vehicle axis between a stowed position and a deployed position, and wherein the second region of the exposed surface is configured to produce the second surface area per unit length when in the deployed position, wherein the second region is in the stowed position during an ascent stage and in the deployed position during a decent stage of the launch vehicle's flight; and
- a propulsion system carried by the launch vehicle and having at least one nozzle positioned at the first end of the launch vehicle to launch the launch vehicle.

14. The system of claim 13 wherein the first exposed surface area per unit length is the largest exposed surface area per unit length of the exposed surface toward the first end of the vehicle, and the second exposed surface area per unit length is the largest exposed surface area per unit length of the exposed surface toward the second end of the vehicle.

15. The system of claim 13 further comprising a sensor operatively coupled to the controller to provide a signal indicative of a change between vehicle ascent and vehicle descent.

16. The system of claim 13 wherein the second region includes multiple deployable panels, with neighboring panels having different circumferential locations.

17. The system of claim 16 wherein neighboring panels overlap.

18. The system of claim 17 wherein the overlapping panels include multiple outer panels and multiple inner panels, with an individual inner panel positioned between and radially inwardly from two adjacent outer panels.

19. The system of claim 13 wherein the second region is pivotably moveable relative to the launch vehicle.

20. The system of claim 13 wherein the second region is generally aerodynamically sealed.

21. The system of claim 13 wherein the second region has air passages positioned to allow air to flow through the deployable surface.

22. The system of claim 13 wherein the second region includes a vane.

23. The system of claim 13 wherein the second region includes a flare.

24. The system of claim 13 wherein the second region includes multiple elements and wherein the controller is programmed with instructions to move an individual element independently of another individual element.

25. The system of claim 13 wherein the second region includes a second deployable surface, and wherein the vehicle includes a first deployable surface positioned toward the first end of the vehicle, and wherein the controller is programmed with instructions to control the motions of the first and second deployable surfaces independently.

* * * * *